United States Patent
Ma et al.

(10) Patent No.: US 9,264,341 B2
(45) Date of Patent: Feb. 16, 2016

(54) METHOD AND SYSTEM FOR DYNAMIC ROUTING AND/OR SWITCHING IN A NETWORK

(75) Inventors: Kenneth Ma, Cupertino, CA (US); Bruce Currivan, Dove Canyon, CA (US); Wael William Diab, San Francisco, CA (US); Jeyhan Karaoguz, Irvine, CA (US); Yong Kim, San Jose, CA (US); Michael Johas Teener, Santa Cruz, CA (US)

(73) Assignee: Broadcom Corporation, Irvine, CA (US)

(*) Notice: Subject to any disclaimer, the term of this patent is extended or adjusted under 35 U.S.C. 154(b) by 382 days.

(21) Appl. No.: 12/571,165

(22) Filed: Sep. 30, 2009

(65) Prior Publication Data

US 2011/0019669 A1 Jan. 27, 2011

Related U.S. Application Data

(60) Provisional application No. 61/228,404, filed on Jul. 24, 2009.

(51) Int. Cl.
| | |
|---|---|
| *H04L 12/28* | (2006.01) |
| *H04L 12/701* | (2013.01) |
| *H04L 12/721* | (2013.01) |
| *H04L 12/725* | (2013.01) |

(52) U.S. Cl.
CPC .............. *H04L 45/00* (2013.01); *H04L 45/124* (2013.01); *H04L 45/302* (2013.01)

(58) Field of Classification Search
CPC ............ H04L 63/0272; H04L 12/4641; H04L 12/4645; H04L 12/4625
USPC .................... 370/238, 389, 395.21
See application file for complete search history.

(56) References Cited

U.S. PATENT DOCUMENTS

| | | | | |
|---|---|---|---|---|
| 6,654,363 B1 * | 11/2003 | Li et al. | .......................... | 370/338 |
| 6,687,230 B1 * | 2/2004 | Furutono et al. | .............. | 370/238 |
| 6,697,372 B1 * | 2/2004 | McAlear | ....................... | 370/402 |
| 6,925,061 B2 * | 8/2005 | Lee et al. | ....................... | 370/238 |
| 7,200,154 B1 * | 4/2007 | Wu et al. | ....................... | 370/468 |
| 7,545,814 B2 * | 6/2009 | Hiironniemi | ............ | 370/395.41 |
| 7,734,758 B1 * | 6/2010 | Lo Bue et al. | ................ | 709/224 |
| 7,792,046 B2 * | 9/2010 | Kucharczyk et al. | ......... | 370/244 |
| 7,869,428 B2 * | 1/2011 | Shake et al. | .................. | 370/389 |

(Continued)

*Primary Examiner* — Brian O'Connor

(74) *Attorney, Agent, or Firm* — Brinks Gilson & Lione

(57) ABSTRACT

Communication devices may determine routes for packets based on packet marking, routing parameters and/or costs associated with routes. A route may be selected and the packets may be communicated via the selected route. The parameters may comprise service class, real time compression, packet preemption, quality measurements, tier bypass and/or power usage information. The costs may comprise capacity, efficiency and/or performance information for power usage, bandwidth, memory and/or processing. The marking may comprise traffic type, user device capabilities, service class, quality measurements, latency requirements and/or power usage information. Endpoint devices, software applications and/or service providers may insert the marking into packets. Routes may be determined and/or selected based on shortest path bridging, audio video bridging, the marking, the routing parameters and/or the costs. Parameters and/or costs may be received and/or discovered from communication devices. Packets and/or the marking may be parsed and/or inspected. Costs may be based on routing parameters.

20 Claims, 5 Drawing Sheets

(56) References Cited

U.S. PATENT DOCUMENTS

| | | | |
|---|---|---|---|
| 8,117,365 B2* | 2/2012 | Kim et al. | 710/106 |
| 8,155,014 B2* | 4/2012 | Jennings et al. | 370/252 |
| 8,279,871 B1* | 10/2012 | Sivan et al. | 370/392 |
| 8,588,239 B2* | 11/2013 | Nakagawa | 370/401 |
| 8,705,549 B2* | 4/2014 | Hazard | 370/419 |
| 8,804,728 B2* | 8/2014 | Rabie et al. | 370/392 |
| 8,885,634 B2* | 11/2014 | Ghodrat et al. | 370/352 |
| 2004/0156345 A1* | 8/2004 | Steer et al. | 370/338 |
| 2006/0056328 A1* | 3/2006 | Lehane et al. | 370/315 |
| 2007/0263554 A1* | 11/2007 | Finn | 370/256 |

* cited by examiner

METHOD AND SYSTEM FOR DYNAMIC ROUTING AND/OR SWITCHING IN A NETWORK

CROSS-REFERENCE TO RELATED APPLICATIONS/INCORPORATION BY REFERENCE

This application makes reference to, claims priority to, and claims the benefit of U.S. Provisional Application Ser. No. 61/228,404, filed on Jul. 24, 2009.

This patent application makes reference to:
U.S. patent application Ser. No. 11/963,017, which was filed on Dec. 21, 2007;
U.S. patent application Ser. No. 11/963,087, which was filed on Dec. 21, 2007;
U.S. Patent Application Ser. No. 61/228,309, was filed on Jul. 24, 2009;
U.S. Patent Application Ser. No. 61/228,368, which was filed on Jul. 24, 2009; and
U.S. Patent Application Ser. No. 61/228,339, was filed on Jul. 24, 2009.

Each of the above stated applications are hereby incorporated herein by reference in its entirety.

FIELD OF THE INVENTION

Certain embodiments of the invention relate to communication systems. More specifically, certain embodiments of the invention relate to dynamic routing and/or switching in a network.

BACKGROUND OF THE INVENTION

The growth of networking and systems' connectivity are some of the major developments in recent decades. Fewer and fewer systems and devices are operated as stand-alone entities, and most of today's systems are increasingly becoming elements in complex networks. This growth in networking allows improved performance and increased flexibility. For example, communication devices such as personal computers (PCs) including laptops, printers, routers, switches, voice communication devices, video and/or audio devices, gaming devices and other devices, are connected together as nodes in communication networks. Networks are designated in a variety of ways, and based on a variety of factors. Network designation may be spatial, based on the scope of connectivity among the network nodes. For example, a network may be designated as a personal area network (PAN), a local area network (LAN), and wide area network (WAN). Network designation may also be based on the backbone connecting technology. For example, a network may be designated as an Ethernet network, a wireless network, and/or a fiber optical network. Some networks are circuit switched and are built around dedicated node-to-node connectivity, wherein a dedicated circuit is created and reserved, when needed, between the communicating nodes. Other nodes are then barred from utilizing the same connection and/or other entities in the network to the extent necessary to maintain the circuit. Most networks in use nowadays, however, are based on packet switched networks. In packet switched networks, the sending node simply transmits traffic that is destined for one or more receiving nodes. The traffic comprises packets that contain, in addition to data, other information that enables directing the packets to the receiving nodes. For example, most of today's networks are Internet based network and utilizes various protocols comprising TCP/IP, for example, to facilitate packet switching. In this regard, data is encapsulated into packets that comprise a header portion and a payload portion to enable transporting, addressing and/or routing among various entities within or coupled to the network.

Network switching devices, comprising such devices as switches, routers and/or hubs, are utilized in networks to facilitate forwarding of traffic between sending and receiving nodes. Hubs contain multiple ports, wherein packets arriving at one port are transmitted via all remaining ports. Consequently, hubs are generally operable to perform minimal processing. Routers and/or switches also comprise multiple ports, but unlike hubs, switches are more actively functional in performing routing operations. For example, routers and/or switches maintain routing information that enable routers and/or the switches to examine received packets and process them accordingly to determine whether the packets are transmitted via the router and/or switch, and if so, to determine the appropriate ports to perform that transmission. Routers and/or switches may store, generate, and/or maintain addressing related information of accessible network nodes.

Some network routers and/or switches, however, may block traffic. Blocking occurs when a router and/or switch reaches a point where it is unable to perform additional switching even though it has not reached its theoretical maximum throughput, which generally is based on the combined maximum speeds of all of its ports.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for dynamic routing and/or switching in a network, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for dynamic routing and/or switching in a network. In various embodiments of the invention, one or more processors and/or circuits in one or more of a plurality of communication devices may determine one or more routes over which packets may be communicated. The packets may be communicated between a first communication device of the plurality of communication devices and a second communication device of the plurality of communication devices. Furthermore, the packets may be communicated based on one or more of corresponding markings within the packets, routing parameters and/or costs that may be associated with utilizing the determined routes. At least one determined route may be selected for communicating the packets between the first communication device and the second communication device, and the packets may be communicated via the at least one selected route.

The routing parameters may comprise information for one or more of service class capabilities, real time compression capabilities, packet preemption capabilities, quality measurement capabilities, tier bypass capabilities and power usage, for example. The one or more costs may comprise information for one or more of capacity, efficiency and/or performance of one or more of power usage, bandwidth, memory and processing, for example. Moreover, the one or more corresponding markings may comprise information for one or more of user device capabilities, service class, quality measurements, latency requirements and power usage requirements, for example. The corresponding markings may be inserted within the packets by one or more of an endpoint device, a software application, a content provider, a consumer, an enterprise and/or a service provider. The markings may comprise a mark, a tag and/or bits embedded in a packet, for example.

One or more routes over which the packets may be communicated may be determined and/or selected based on one or more of shortest path bridging and audio video bridging. Additionally, one or more routes over which the packets may be communicated may be selected based on the one or more corresponding markings within the packets, the routing parameters and/or the costs. The routing parameters and/or the costs may be received and/or discovered from the plurality of communication devices. The packets and/or the corresponding markings may be parsed and/or inspected. One or more costs may be based on one or more of the routing parameters. In this manner, routing of packet data via one or more network nodes may be based on markings within the data, routing parameters and/or costs associated with the network nodes.

Figure 1:
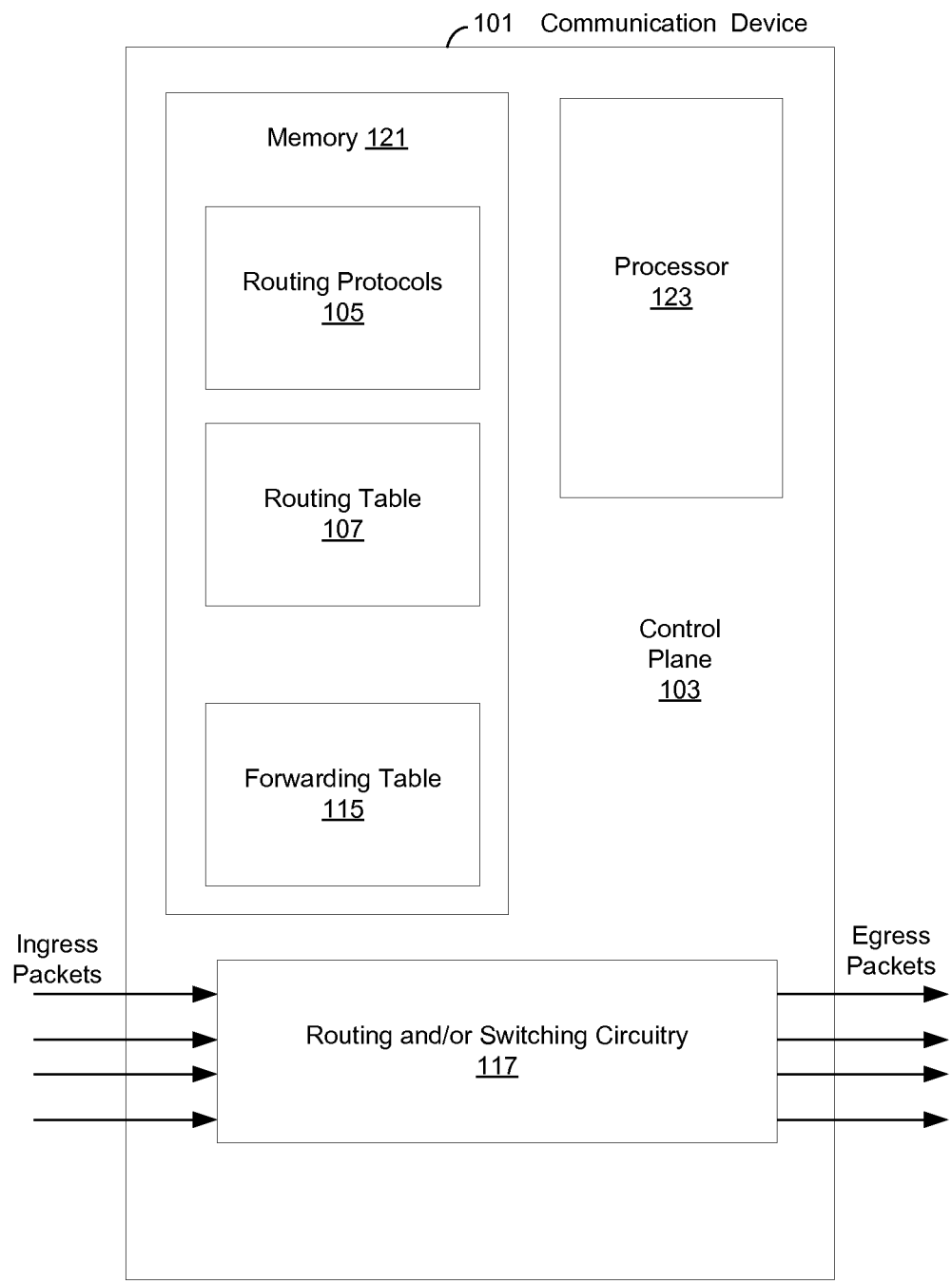
FIG. 1 is a block diagram that illustrates an exemplary device that is operable to dynamically route and/or switch data, in accordance with an embodiment of the invention.

FIG. 1 is a block diagram that illustrates an exemplary device that is operable to dynamically route and/or switch data, in accordance with an embodiment of the invention. Referring to FIG. 1, there is shown a communication device 101, a processor 123, a memory 121, a control plane 103, routing protocols 105, a routing table 107, a forwarding table 115 and a routing and/or switching circuitry 117.

The communication device 101 comprises suitable logic, circuitry, interfaces and/or code that may be operable to route packets and/or to forward data received from one communication device to another communication device. In this regard, the communication device 101 may be a network node and/or an endpoint device. Routing operations within the communication device 101 may be performed based on one or more networking layers, for example, based on the Open Systems Interconnection (OSI) model. In various embodiments of the invention, the communication devices 101 may be operable to perform OSI L2, L3 and/or L4 operations. Furthermore, the communication device 101 may be operable to utilize information embedded within data that may be pending delivery to another communication device. The embedded information may indicate a preferred method to handle and/or route the data, and/or requirements for optimal communication of the data. For example, a data packet may comprise a mark and/or a tag that may indicate a service class and/or latency requirements associated with the data. Moreover, when making routing decisions, the communication device 101 may be operable to utilize a plurality of routing parameters and/or costs associated with one or more communication devices that may be candidates for routing the data through a network, for example. The communication device 101 may be implemented on a single chip, using a chipset, on a single device and/or a plurality of devices, for example.

The control plane 103 may comprises suitable logic, circuitry, interfaces and/or code that may be operable to determine how the communication device 101 will handle packets that are received and forwarded. The control plane 103 may be operable to determine that a packet may be discarded or that a packet may receive a specified quality of service. The control plane 103 comprises routing protocols 105 that may specify how the communication device 101 communicates with other communication devices and/or how routes are selected, for example. In addition, the routing protocol 105 may determine how a routing table is constructed. Exemplary routing protocols 105 comprise interior gateway routing protocol (IGRP), open shortest path first (OSPF), routing information protocol (RIP) and intermediate system to intermediate system (IS-IS). The control plane 103 may also comprise the routing table 107 that may comprise routes to particular network destinations.

The control plane 103 may be operable to implement shortest path bridging (SPB) and/or audio video bridging (AVB), for example. In this regard, the communication device 101 may be operable to route packet data based on a desired path cost and/or a desired quality of service (QoS). For example, the communication device 101 may be operable to route data via a least cost path and/or a shortest path wherein the path utilized for routing the data may be AVB enabled. Furthermore, the communication device 101 may be operable to monitor other network nodes which may be AVB enabled and may be operable to establish a route via AVB enabled network nodes. U.S. patent application Ser. No. 11/963,017, which was filed on Dec. 21, 2007 and U.S. patent application Ser. No. 11/963,087, which was filed on Dec. 21, 2007 discloses SPB and/or AVB routing protocol, and are each hereby incorporated herein by reference in its entirety.

The control plane 103 may be operable to utilize one or more routing parameters when determining routes and/or handling packet data. For example, parameters may enable packet preemption, quality measurements and/or reporting of quality measurements, tier bypass and/or power and/or resource efficiency. Various routing parameters are described with respect to FIG. 2.

The control plane 103 may be operable to route packets and/or configure circuitry according to information that may be parsed from the packets. For example, the packets may comprise one or more marks and/or tags that may indicate how to process and/or how to route the packets. The mark and/or tag information may indicate that one or more packets may have higher priority over other packets that may be pending delivery. For example, packets requiring low latency may be handled differently than other packets. In this regard, capabilities of a user device and/or an application that may be a source of the packet and/or a destination of the packet may be specified in a mark and/or tag. The mark and/or tag may specify that data pending delivery may comprise voice over IP data and/or multi-party interactive Internet gaming data as an indication of how to handle and/or route the data, for example. Furthermore, a mark and/or tag may indicate that data routed for a particular user may be handled and/or routed according to a specified service class. Various exemplary marks and/or tags are described with respect to FIG. 2.

The control plane 103 may also be operable to route data based on one or more costs associated with communication devices that may be candidates for a packet delivery route. The costs may comprise factors such as one or more of power usage, bandwidth availability, memory availability, processing capabilities, energy efficiency, shortest path bridging availability and/or audio video bridging availability.

The control plane 103 may comprise suitable logic, circuitry, interfaces and/or code that may be operable to accept a packet arriving on an ingress link, look up a destination address for the packet and determine an internal path through the routing and/or switching circuitry 117 that will direct the packet outward via a proper egress link. The control plane 103 may be operable to encapsulate egress packets and set various packet fields. For example, the control plane 103 may modify a field for quality of service and/or quality measurements or may decrement a time-to-live field in the packet and may discard the packet if the time-to-live equals zero. The control plane 103 may update a check sum.

The routing and/or switching circuitry 117 may comprise suitable logic, circuitry, interfaces and/or code that may be operable to direct packets received from a plurality of ingress links to one or more egress links. The routing and/or switching circuitry 117 may comprise, for example, input queuing and output queuing. In addition, the routing and/or switching circuitry 117 may comprise a subsystem which may comprise suitable logic, circuitry, interfaces, and/or code that may enable exchange of data and/or messaging via a plurality of physical interconnects.

The memory 121 may comprise suitable logic, circuitry, interfaces and/or code that may be operable to store instructions and/or parameters that enable functionality described with respect to the control plane 103. For example, the memory 121 may be operable to store routing parameters, costs associated with one or more communication devices and/or marked data from packets pending delivery. The memory 121 may be operable to store packet data that may be received and/or forwarded by the communication device 101. Moreover, the memory 121 may store the routing table 107. The routing table 107 may comprise routing information that may be sent to the forwarding table 115 in the control plane 103. The routing information may comprise preferred routes chosen by a routing algorithm according to various routing parameters, costs, data marking information for forwarding packets. The memory 121 may be communicatively coupled to the processor 123 and/or the routing and/or switching circuitry 117.

The processor 123 may comprise suitable logic, circuitry, interfaces and/or code that may be operable to execute instructions and/or utilize parameters that may enable functionality described with respect to the control plane 103. The processor 123 may be communicatively coupled to the memory 121 and/or the routing and/or switching circuitry 117. The processor 123 may manage the communication of packets based on the routing protocols 105. In addition, the processor 123 may receive information from other routers and/or other communication devices and may utilize the received information to construct the routing table 115. The processor 123 may be operable to receive and/or utilize information based on routing parameters and/or costs of one or more other network nodes when making routing decisions. For example, information regarding support by the other one or more network nodes for specified user device and/or application data types, various user service classes, packet preemption, quality measurements and/or reporting of quality measurements, tier bypass and/or power and/or resource efficiency.

In operation, the communication device 101 may be utilized to perform network operations. The communication device 101 may be utilized, for example, in a local area network (LAN), to enable transfer of traffic packets between network nodes in the LAN. For example, where received traffic packets are TCP/IP traffic packets, the IP headers may be parsed to determine the source and/or destination addressing information for the received traffic packets. Once the destination nodes are determined, based on routing tables maintained in the memory 121 for example, the packets may be transmitted via the control plane 103.

The communication device 101 may be operable, for example, to maintain routing information that may enable mapping of a set of destination addresses corresponding to various network nodes, to a plurality of egress links in the communication device 101. The routing information may be stored, generated, and/or maintained by the processor 123 of the communication device 101, for example. Once the appropriate egress links are determined for a received packet, the routing and/or switching circuitry 117 may be utilized to transfer the packet to the appropriate egress links.

In some communication devices, for example, hardware, software and/or logic limitations in the communication device 101 may result in 'blocking.' Blocking occurs when a reaches a point where it is unable to perform additional routing and/or switching even though it has not yet reached its theoretical maximum throughput, which generally is based on the aggregate maximum speeds of all of its ports.

In various embodiments of the invention, the processor 123 may be operable to determine information indicating how to handle packet data and/or about capabilities of one or more communication devices that may be candidates for handling packets that are being routed through a network. The information may comprise various routing parameters, costs and/or marks inserted within packet data. In this regard, the information may enable support of user device capabilities, support of specified service classes, packet preemption, real time compression, quality measurements, tier bypass and/or power efficient communication. Furthermore, the information may comprise one or more power consumption, bandwidth, memory and/or processing costs associated with communicating via a specified device. In this regard, the processor 123 may be operable to make routing decisions based on the determined information. For example, a route may be chosen for delivery of packet data based on a plurality of factors rather than based on a minimum number of hops, for example. The marks may be referred to as markings and/or tags.

The marks that may be inserted within packet data may enable a network device, for example, the communication device 101, to determine a type of traffic that is received by the device. The mark may classify and/or describe the packet data. The mark data may enable a network device such as the communication device 101 to determine a type of data without having to perform deep packet inspection. The marks may be standardized and/or non-standardized, for example, marking techniques may be proprietary. In various embodiments of the invention, the marks may be tags, for example, that may be utilized based on an IEEE 802.3 standard and/or an extension and/or variation thereof. A packet data mark may comprise an Ethertype, for example. Moreover, marking may be placed within a packet payload, an IP header, an IP tag and/or an IP payload, for example. In this manner the marking information may be communicated to network devices.

In an exemplary aspect of the invention, the communication device 101 may be operable to communicate information regarding its own routing parameters and/or costs to one or more neighboring communication devices. In addition, the communication device 101 may be operable to receive similar information from one or more of its neighboring communication devices and may make decisions about where, when and/or how to route the various types of traffic based on that information.

In an exemplary embodiment of the invention, the communication device 101 may be operable to send multi-party Internet interactive gaming packets to a specified destination via one or more routes. For example, the communication device 101 may have a packet that is pending delivery. The packet may comprise a mark and/or tag which indicates that a destination end device for the packet has multi-party Internet interactive gaming capabilities. The communication device 101 may choose a route for communicating the packet that comprises communication devices capable of transmitting the gaming packet with the lowest latency rather than a route that may comprise fewer hops but would result in higher latency. In this regard, the communication device 101 may utilize packet preemption, real time compression and/or tier bypass to communicate the gaming packet with a latency low enough to support the multi-party interactive Internet gaming application. Moreover, the communication device 101 may also utilize shortest path bridging and/or audio video bridging to route the gaming data with the required latency. In addition to latency considerations, power efficiency may be considered along with latency requirements when determining a route for the gaming packets.

The processor 123 may be operable to determine routing and/or processing criteria for data that may be pending delivery from the communication device 101. In this regard, the processor 123 may be operable to consider trade-offs between various routing parameters, costs and/or desired performance for routing the data via one or more communication devices along a communication path. In this manner, a communication path through a network may be determined based on one or more of a plurality of routing criteria, routing parameters and/or costs that may comprise, for example, user device capabilities, service class, packet preemption, real time compression, quality measures, tier bypass, power consumption, shortest path route, audio video bridging, bandwidth, memory and processing. The tradeoffs may be determined based on, for example, a type of data being transmitted, a particular class and/or type of service being provided, and/or based on user and/or service provider preference.

Figure 2:
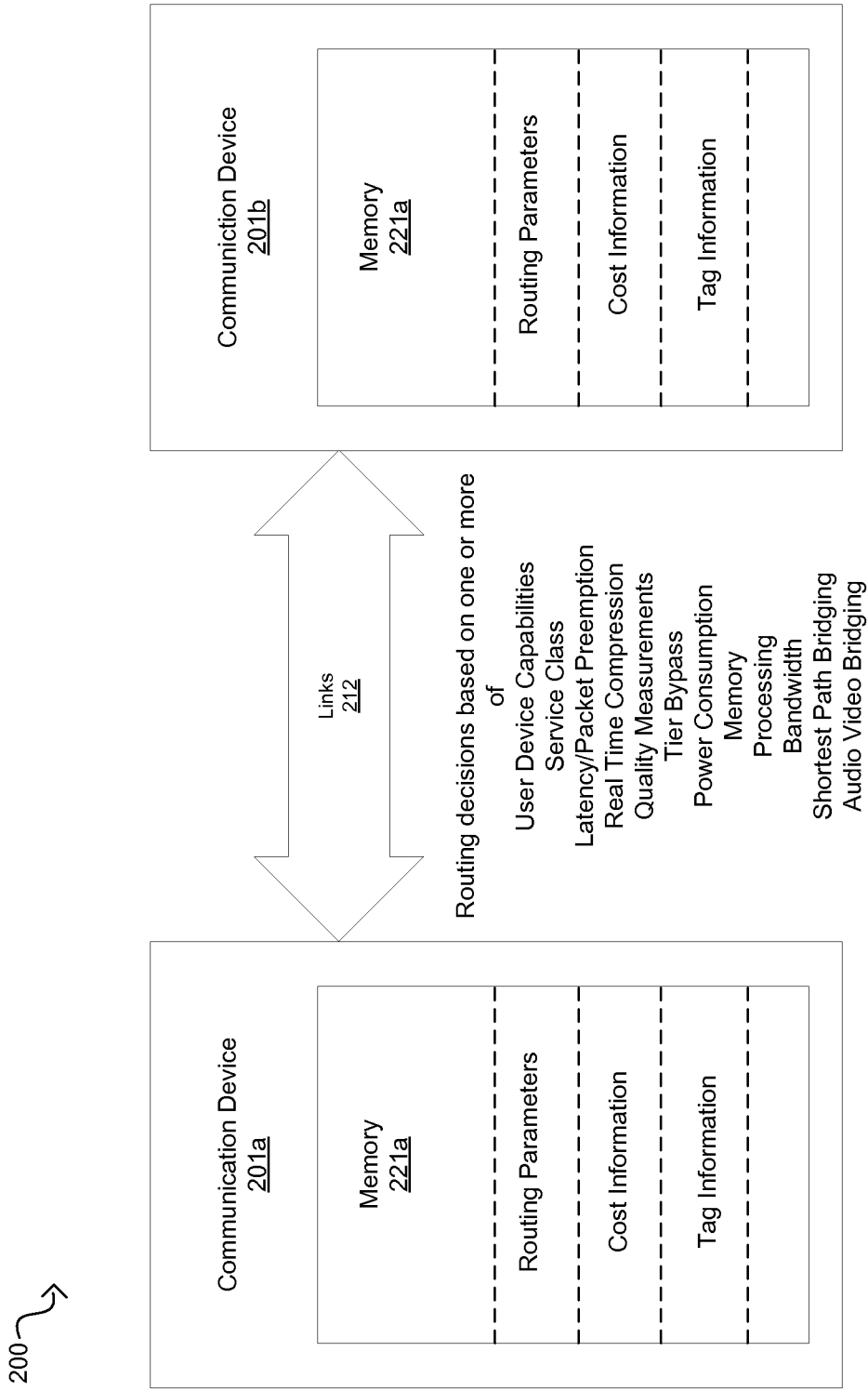
FIG. 2 is a block diagram illustrating an exemplary plurality of communication devices that are enabled to route data based on one or more of routing parameters, costs associated with a device and/or data mark and/or tag information, in accordance with an embodiment of the invention.

FIG. 2 is a block diagram illustrating an exemplary plurality of communication devices that are enabled to route data based on one or more of routing parameters, costs associated with a device and/or data mark and/or tag information, in accordance with an embodiment of the invention. Referring to FIG. 2, there is shown a communication system 200. The communication system may comprise two communication devices 201a and 201b and/or a plurality of communication links 212. The communication devices 201a and/or 201b may comprise memories 221a and/or 221b respectively.

The communication devices 201a and 201b may be similar and/or substantially the same as the communication device 101 described with respect to FIG. 1. The communication devices 201a and 201b may be operable to communicate via a plurality of communication links 212. In an exemplary embodiment of the invention, the plurality of links 212 may be Ethernet links. In this regard, the plurality of links 212 may comprise, for example, unshielded twisted pair cables, coaxial cables, fiber optic cables, and/or wireless connections. The memory devices 221a and/or 221b may be similar and/or substantially the same as the memory 121 described with respect to FIG. 1. The memory devices 221a and/or 221b may comprise one or more of tables, databases, and other data structures that may comprise the routing parameters, network node capabilities, costs associated with routing via the communication device 201a and/or 201b and/or data received via marks and/or tags within packet data that may provide information about how to route the packet data.

In operation, the communication device 201a may comprise suitable logic, circuitry, interfaces and/or code that may be operable to determine criteria for routing data that may be pending delivery based on one or more marks and/or tags and/or bits that may be embedded within the data. For example, the communication device 201a may receive data that may comprise one or more markings and/or tags that may indicate the criteria for processing and/or routing the data via one or more network nodes to one or more endpoint devices, described with respect to FIG. 3.

In addition, the communication device 201a may be operable to determine various parameters, capabilities and/or costs of one or more network nodes, for example, the communication device 201b, that may be operable and/or available for routing the data to one or more network nodes and/or endpoint devices. The communication device 201a may determine and/or select one or more routes over which the data may be communicated based on the determined criteria for the data and/or the routing parameters, network node capabilities and/or the costs associated with one or more communication devices, for example the communication device 201b. In various embodiments of the invention, the one or more markings, tags and/or bits that may be embedded within the data may correspond to various routing parameters, capabilities and/or costs of a communication device and/or network node. In this regard, the markings, tags and/or bits may indicate how the data may be processed and/or routed.

The routing parameters, capabilities and/or costs may be communicated to the communication device 201a and/or between network nodes via one or more of a plurality of methods. For example, the routing parameters capabilities and/or costs associated with the device 201b and/or other network nodes may be communicated to the communication device 201a during auto-negotiation with the communication device 201a. In another exemplary embodiment of the invention, the routing parameters, capabilities and/or costs of the communication device 201b and/or other network nodes may be communicated utilizing link layer discovery protocol (LLDP). In this regard, the communication device 201*a* may be operable to query the device 201*b* utilizing simple network management protocol (SNMP) for the parameters, capabilities and/or costs stored in the memory 201*b*. Moreover, bridge protocol data units (BPDUs) may be modified to indicate routing parameters, capabilities and/or cost information for a network node. Notwithstanding, the invention is not limited to any specific method of identifying parameters, capabilities and/or costs of one or more network nodes and any suitable method may be utilized. For example, proprietary methods and/or standardized methods may be utilized.

One or more exemplary routing parameters and/or capabilities of the communication devices 201*a*, 201*b* and/or other network nodes may enable packet preemption. Packet preemption may allow packets with a greater need to be delivered sooner than other packets to be delivered prior to the other packets. In this regard, prioritization of packets may be based on, for example, service class and/or latency requirements. For example, the communication device 201*a* may route data that may have originated from different applications such as voice over Internet protocol (VOIP), multi-party interactive Internet gaming, email and/or web browsing. The different applications may have different latency requirements for communicating the data with a desired level of performance. Data marking, tags and/or information comprised within a packet and/or packet data may indicate a desired latency for the packet. In this regard, the communication device 201*a* may schedule transmission of one or more packets that are pending delivery so that packets requiring lower latency are transmitted prior to packets with less stringent latency requirements. The communication device 201*a* may re-order the schedule to accommodate newly arrived packets requiring low latency routing. Alternatively, when the communication device 201*a* is currently in a process of transmitting a first packet with less stringent latency requirements and a second packet with more stringent latency requirements becomes available, the transmission of the first packet may be interrupted and the second packet may be transmitted. Once transmission of the second packet has completed and/or there are no other packets of lower latency requirements that are suitable to transmit, the communication device 101 may continue to transmit the first packet. U.S. Patent Application Ser. No. 61/228,368, which was filed on Jul. 24, 2009.

Another exemplary routing parameter and/or capability of the communication devices 201*a*, 201*b* and/or other network nodes may enable real time compression between two network nodes. In this regard, a sending and receiving node may be operable to handle real time compression wherein the sending node may be operable to reduce the length of a packet and/or transmit fewer packets to transmit a specified data and the receiving node may be operable to decompress the packet data. For example, real time video compression within a transmitting network node such as the communication device 201*a*, may be utilized to compress video data that may be received by a receiving network node such as the communication device 201*b*. In various exemplary embodiments of the invention, the video data may be reduced by a factor of two and/or the compression may be lossless and/or near lossless. In this regard, data communicated via the communication devices 201*a*, 201*b* and/or other network nodes may comprise information regarding how the communicated data may be compressed with regard to loss. For example, a mark, tag and/or bits comprising the compression information may be inserted within a packet. The tag and/or bits may be inserted by an endpoint device that may have originated the packet and/or by a service provider handling the packet for example. Moreover, other types of routed data, for example, text and/or voice may be compressed and/or decompressed by a pair of nodes handling the routed data.

Power consumption information for one or more network nodes may be utilized to make routing decisions. For example, information regarding power consumption may comprise how much power a communication device consumes when communicating data at a specified bandwidth. For example, a specified number of Watts and/or Joules utilized for a specified transmitted bits per second may be specified. In this regard, power consumption information, for example, Joules per bit for a communication device may be stored within the device and/may be communicated to other communication devices that may route data to that device.

In another exemplary embodiment of the invention, the information regarding power consumption may comprise a current level of power usage by a communication device, for example, indicating a level of power consumption at a certain time. The current level of power consumption may be communicated to and/or discovered by other communication devices. U.S. Patent Application Ser. No. 61/228,432, which was filed on Jul. 24, 2009 discloses various aspects for making routing decisions based on power consumption, and is hereby incorporated herein by reference in its entirety. Criteria for power consumption and/or bandwidth for communicating specified data may be determined. For example, a power per bandwidth criteria may comprise a specified number of Watts and/or Joules utilized for a specified number of transmitted bits per second. In this regard, information within a packet header, for example, a within a marking and/or a tag and/or a parameter, may indicate power consumption criteria and/or other criteria for communicating the packet. In various embodiments of the invention, reserved bits in an OSI layer two or higher OSI layer header may be utilized to communicate the power consumption and/or bandwidth criteria, for example.

The communication device 201*a* may be operable to consider trade-offs between bandwidth and power consumption to determine a best route for the data pending delivery. A communication path through a network may be determined based on various criteria corresponding to data pending transmission and/or on power consumption characteristics of communication devices along the communication path. The tradeoff may be determined based on, for example, a desired latency, desired bandwidth, service class, performance, shortest path bridging and/or power consumption.

Figure 3A:
FIG. 3A is a block diagram illustrating an exemplary packet comprising an OSI L2 mark, in accordance with an embodiment of the invention.

FIG. 3A is a block diagram illustrating an exemplary packet comprising an OSI L2 mark, in accordance with an embodiment of the invention. Referring to FIG. 3A, there is shown a data packet 300 that may comprise a start of a packet header 302, a MAC source address header (MAC SAH) 304, a MAC destination address header (MAC DAH) 306, a payload 308, and an end of packet header 310 and a mark 312.

The start of packet header 302 may comprise data that may indicate to a receiving communication device, for example the communication 201*b*, where the packet 300 begins. The MAC SAH 304 may comprise data that may indicate which communication device is transmitting the packet 300 and the MAC DAH 306 may indicate which device is receiving the packet 300. The payload 308 may comprise packet data and/or headers for OSI higher layer processing. The payload 308 may comprise data transmitted from an endpoint device that may be stored in the endpoint device and/or generated by an application in the endpoint device. For example, the payload 308 may comprise video conferencing data, multi-party Internet gaming data, VOIP data and/or web browsing data, for example. Accordingly, the payload 308 may require a specified level of latency in order to realize an acceptable quality of communication. Moreover, the payload 308 may require a specified class of service based on a service or subscriber agreement purchased by a user associated with the payload 308. The end of packet 310 may indicate to a receiving device 201b where the packet 300 ends. The mark 312 may comprise bits embedded within the packet 300 and/or may be part of an OSI layer 2 and/or higher OSI layer header. For example, an endpoint device, application software on the endpoint device and/or a network node may be operable to originate communication of the payload 308 and/or may generate a mark in an OSI layer 2 or higher OSI layer header. In another exemplary embodiment of the invention, a service provider that may manage and/or operate the communication devices 201a and/or 201b, for example, may insert a mark into a packet.

The packet 300 may comprise one or more marks and/or embedded bits that may indicate criteria for processing and/or routing the packet 300 via one or more network nodes, for example, via the communication devices 201a and/or 201b. In various embodiments of the invention, the one or more marks, tags and/or embedded bits within the packet 300 may correspond to various routing parameters, network node capabilities and/or costs associated with a specified communication device and/or network node. In this regard, the mark, tag and/or embedded bits may indicate how the packet 300 may be processed, prioritized and/or routed.

Figure 3B:
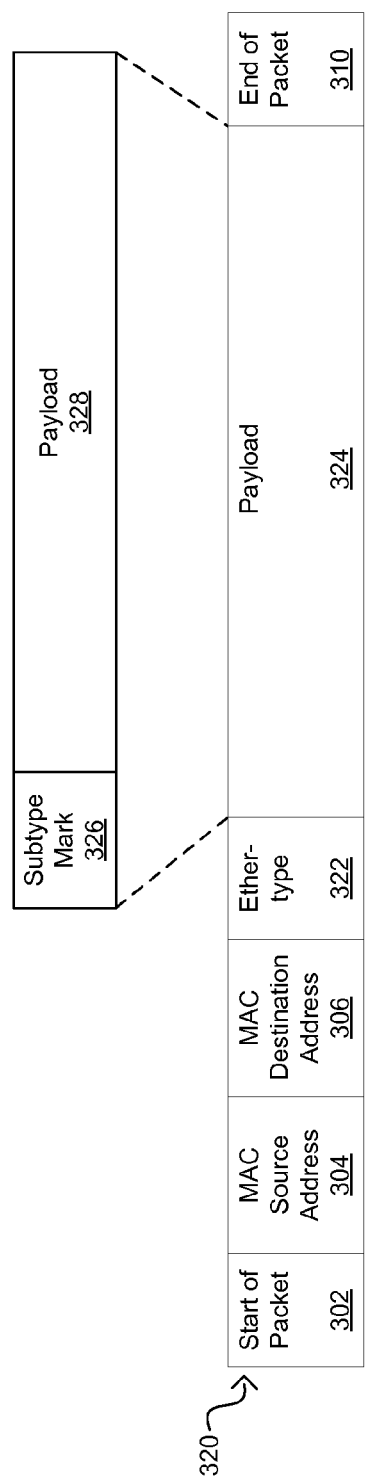
FIG. 3B is a block diagram illustrating an exemplary packet comprising an OSI Ethertype mark, in accordance with an embodiment of the invention.

FIG. 3B is a block diagram illustrating an exemplary packet comprising an OSI Ethertype mark, in accordance with an embodiment of the invention. Referring to FIG. 3B, there is shown a data packet 320 that may comprise the start of a packet header 302, the MAC source address header (MAC SAH) 304, the MAC destination address header (MAC DAH) 306, and the end of packet header 310. In addition, there is shown an Ethertype 322, a payload 324, a subtype mark 326 and a payload 328.

The Ethertype 322 field may comprise information that may be utilized to identify the protocol being transported in the packet, for example, IPv4 or IPv6. The protocol indicated by the Ethertype may utilize marks within the data packet 320 that may specify a type of traffic that the packet 300 belongs to. The type of traffic may indicate how the packet 300 may be processed, prioritized and/or routed. In this regard, a network device may look for the marks within the payload 234 when the Ethertype 322 field indicates a protocol that utilizes the marks. In an exemplary embodiment of the invention, the network device may be operable to parse the payload 328 to find the subtype mark 326 that may comprise the traffic type information.

Figure 3C:
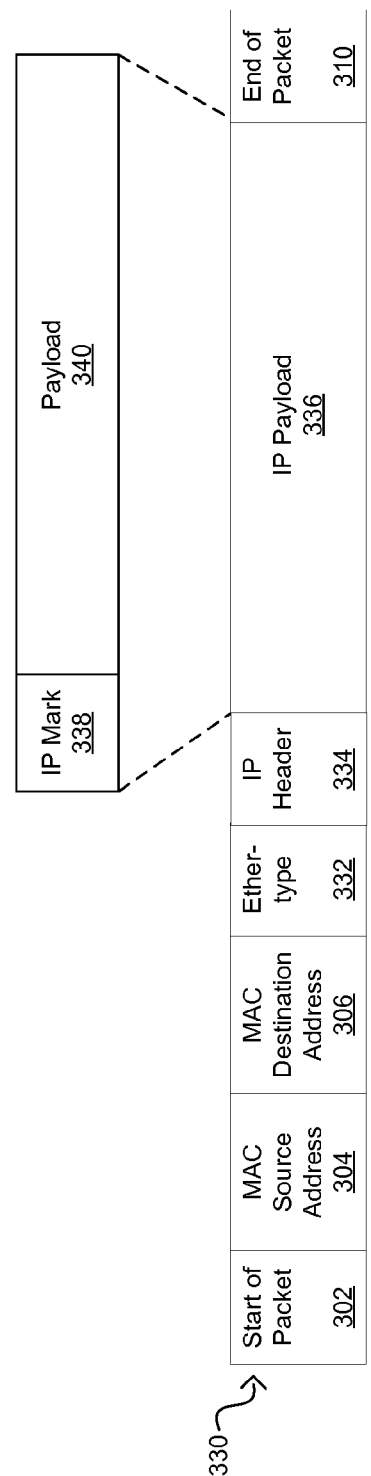
FIG. 3C is a block diagram illustrating an exemplary packet comprising an IP mark, in accordance with an embodiment of the invention.

FIG. 3C is a block diagram illustrating an exemplary packet comprising an IP mark, in accordance with an embodiment of the invention. Referring to FIG. 3C, there is shown a data packet 330 that may comprise the start of a packet header 302, the MAC source address header (MAC SAH) 304, the MAC destination address header (MAC DAH) 306 and the end of packet header 310. In addition, there is shown an Ethertype 332 an IP header 334, a payload 336, an IP mark 338 and a payload 340.

The Ethertype 332 field may comprise information that may be utilized to identify the protocol being transported in the packet, for example, IPv4 or IPv6. The IP header 334 may comprise information about the packet such as an ID and/or version for the packet, source and destination information and/or protocol information. In various embodiments of the invention, the IP header 334 may comprise a mark to indicate the type of traffic or content comprised within the packet that may determine how the packet 300 may be processed, prioritized and/or routed. In other embodiments of the invention, the mark may be embedded in the IP payload 336. For example, a network device that may receive the packet 330 may parse the IP payload 336 to find the IP Mark 338 that may comprise the traffic type information.

Figure 4:
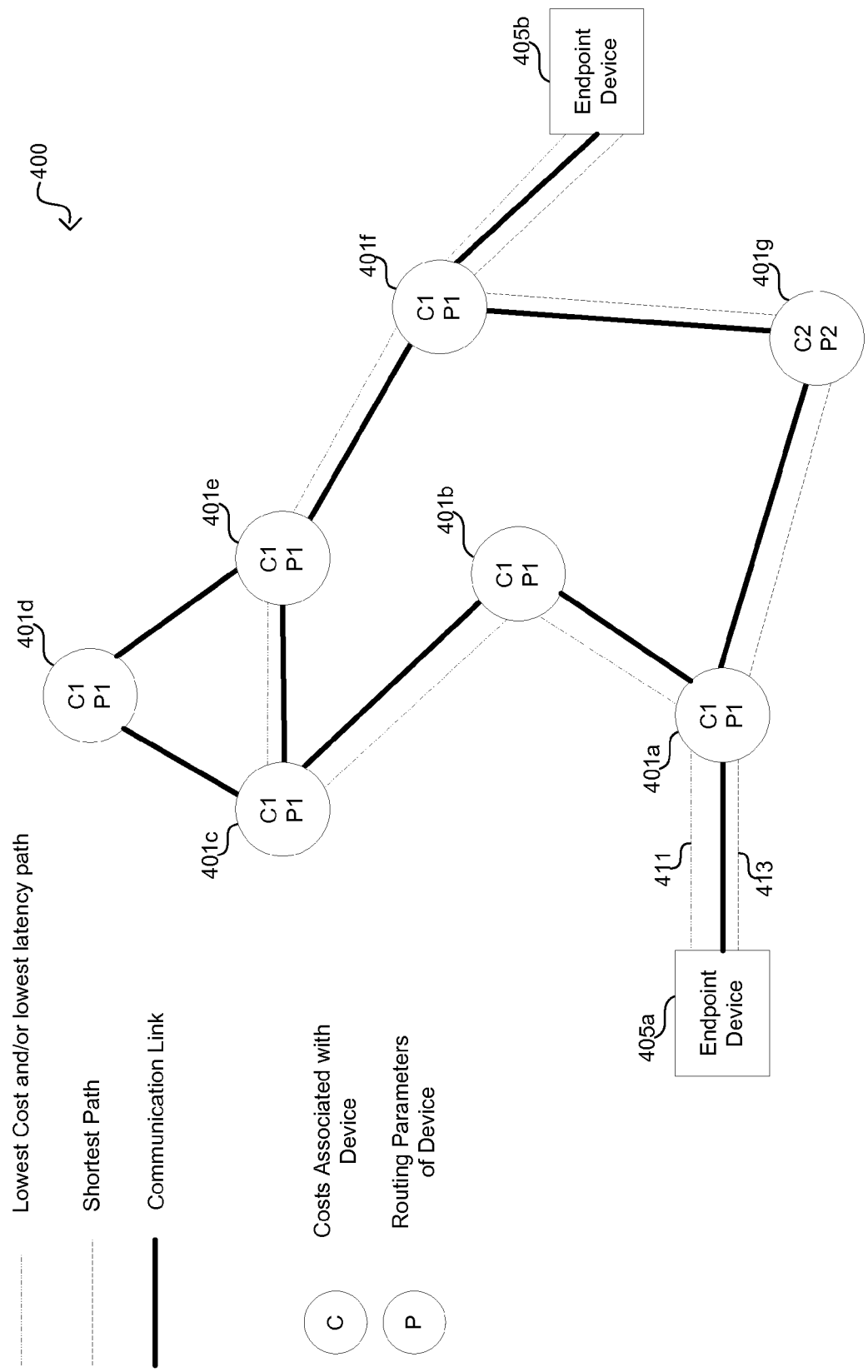
FIG. 4 is a block diagram illustrating an exemplary data delivery route comprising endpoint devices and a plurality of network nodes which may be determined based on routing parameters, costs associated with a device and/or marked and/or tagged packet data, in accordance with an embodiment of the invention.

In operation, one or more packets, for example, the one or more of the packets 300, 320 and 330 may be generated by an endpoint device (described with respect to FIG. 4). The endpoint device may have a certain capability and/or may host an application that may generate one or more of the packets 300, 320 and 330. For example, the packets 300, 320 and/or 330 may comprise multi-party interactive Internet gaming data that may require a very low latency in order for the interactive game to adequately communicate high speed input by a plurality of users. The endpoint device may generate one or more of the marks 312, 326 and/or 338 that may indicate the endpoint device multi-party interactive Internet gaming capability. In this regard, a network node, for example, the communication device 201a may receive one or more of the packets 300, 320 and 330 and may parse the packet and/or may perform packet inspection in order to determine the endpoint device capabilities. For example, the communication device 201a may inspect the mark 312, 326 and/or 338 and may determine that the packet 300, 320 and/or 330 comprises multi-party interactive Internet gaming capability and/or requires very low latency communication. Accordingly, the communication device 201a may determine a path for routing the packet 300, 320 and/or 330 based on one or more routing parameters stored within the device. For example, the communication device 201a may route packets based on shortest path bridging and/or may utilize AVB. Furthermore, the communication device 201a may perform real time compression on the one or more packets 300, 320 and 330 data that may reduce the packet size by a factor of two, for example. The communication device 201a may also preempt one or more other packets that may be pending delivery by the device 201 so that the multi-party interactive Internet gaming data from the packets 300, 320 and/or 330 may be communicated to the communication device 201b, for example, with very low latency.

FIG. 4 is a block diagram illustrating an exemplary data delivery route comprising endpoint devices and a plurality of network nodes which may be determined based on routing parameters, costs associated with a device and/or marked and/or tagged packet data, in accordance with an embodiment of the invention. Referring to FIG. 4, there is shown, a network 400 comprising two endpoint devices 405a and 405b and seven network nodes 401a, 401b, . . . , 401g. In addition, the network 400 comprises network paths 411 and 413.

The two endpoint devices 405a and/or 405b may comprise suitable logic, circuitry, interfaces and/or code that may be operable to communicate via the network 400 wherein packet markings and/or tags, routing parameters and/or costs may be utilized to meet various routing and/or communication criteria. Moreover, the endpoint devices 405a and/or 405b may be operable to communicate via the network 400 utilizing AVB. In an embodiment of the invention, the endpoint device 405a may be a server operated by a service provider and the endpoint device 405b may be a user device, for example, a laptop, however, the invention is not so limited. In this regard, the endpoint devices 405a and/or 405b may be any suitable communication device, for example, the endpoint devices 405a and/or 405b may comprise a mobile phone, a smart phone, a media player, a gaming device, a location device, a video server, a service provider head-end and/or a set-top-box. In various embodiments of the invention, the endpoint devices 405a and 405b may be the same and/or similar devices, for example, two laptops.

The network nodes 401a, 401b, ..., 401g may comprise suitable logic, circuitry, interfaces and/or code that may be operable to transmit and/or receive data via the network 400. For example, the network nodes 401a, 401b, ..., 401g may comprise a bridge, a switch and/or a router. The network nodes 401a, 401b, ..., 401g may be similar and/or substantially the same as the communication devices 101, 201a and/or 201b, for example. In this regard, one or more of the network nodes 401a, 401b, ..., 401g may comprise one or more routing parameters and/or stored network node capabilities that may be utilized for routing data via the network 400 as described with respect to, for example FIG. 1, FIG. 2 and/or FIG. 3. Furthermore, one or more costs may be associated with one or more of the network nodes 401a, 401b, ..., 401g as described with respect to, for example FIG. 1, FIG. 2 and/or FIG. 3. The network nodes 401a, 401b, ..., 401g and/or the endpoint devices 405a and/or 405b may be operable to communicate at any suitable standard and/or non-standard speed, may operate based on any suitable standard and/or non-standard technology and/or may communicate over any suitable medium, for example, copper, optical, wireless and/or backplane technologies, and/or may utilize and suitable connection type, for example, PON. For example, the network 400 may be a heterogeneous wired and/or wireless network. Moreover, the network 400 may be comprise any suitable deployment type, for example, the network 400 may comprise a service provider network, a content provider network, a consumer network, an access network, a distribution network, an enterprise network, a data center and/or a wireless backhaul network.

The network path 411 may comprise a least cost path and/or a lowest latency path between the end devices 405a and 405b. The network path 413 may comprise the shortest path between the endpoint devices 405a and 405b. In various embodiments of the invention, there may be a plurality of paths through a network where some nodes within the network may be bypassed, for example, based on routing parameters, costs associated with a device and/or marked and/or tagged packet data, for example.

In operation, a user of the endpoint device 405b may have a service agreement with a service provider for communicating data based on a specified service class. For example, the service class may specify a minimum bandwidth and/or latency that a user of the endpoint device 405b may be entitled to for a specified type of data. In an exemplary embodiment of the invention, the endpoint device 405a may be a video server that may stream video to the endpoint device 405b via the network 400. The endpoint device 405b may be a set top box, for example. The endpoint device 405a may insert one or more markings and/or tags within one or more packets of the video stream to indicate the user's specified service class to network nodes that may handle the video stream. The network nodes 401a, 401b, ..., 401f may comprise various routing parameters, network node capabilities and/or associated costs that may enable the network nodes 401a, 401b, ..., 401f to handle and/or route a video stream from the endpoint device 405a to the endpoint device 405b in accordance with the user's specified service class. The network node 401g may have limited routing parameters and/or limited network node capabilities. Moreover, the network node 401g may have one or more associated costs with regard to bandwidth, memory and/or processing, for example, which may indicate that the network node 401g may not be able to handle the video stream data at the user's specified service class. In this regard, the video stream communicated from the endpoint device 405a to the endpoint device 405b may optimally be routed via the network nodes 401a, 401b, 401c, 401e and/or 401f. In this manner, the video stream may be communicated in accordance with the user's specified service class even though another route via the network nodes 401a, 401g and/or 401f may comprise a fewer number of hops.

In another exemplary embodiment of the invention, various routing parameters and/or capabilities of the network nodes 401a, 401b, ..., 401f may enable quality measurements to be taken within the network nodes. The quality measurements may be utilized to improve routing of data between the endpoint devices 405a and/or 405b. The quality measurements may be taken for specified data and/or a specified packet handled by the network nodes 401a, 401b, ..., 401f. Moreover, the quality measurements may be utilized to report performance problems to an endpoint device, a user and/or service provider. In this regard, the network node 401a, 401b, ..., 401f may be operable to receive data from the endpoint device 405a, may measure various performance metrics, and may send the measurements back to the endpoint device 405a. For example, packet retries, latency, data rate, packet error rate and/or duration of errors may be measured and/or reported back to the endpoint device 401a.

In another embodiment of the invention, quality measurements may be taken at an endpoint device that may be receiving and/or rendering the data and the quality measurements may be reported back to an originating endpoint device and/or a service provider for example. In this regard, the receiving device, for example, the endpoint device 405b may send data comprising various performance measurements such as dB ratios, signal to noise ratios and/or packet errors to the endpoint device 405a and/or a service provider. The endpoint devices 405a and/or 405b and/or the service provider may indicate that quality problems may be occurring in the network 400 and/or may provide information to the network nodes 401a, 401b, ..., 401f. The provided information may enable improvement in network performance. The information may be communicated to the network nodes 401a, 401b, ..., 401f by inserting marks, tags and/or information within data that may be routed via the network 400. For example, a user of the endpoint device 405b may subscribe to and/or purchase a service agreement from a service provider for a specified class of service and/or for a specified bandwidth, for example. The user device may measure the quality of service it receives and may report it to the service provider. Based on the user's service agreement and/or the quality measurements, the service provider may mark, tag and/or otherwise indicate within packets being sent to the endpoint device 405b how to handle and/or route the data according to the service agreement. Routing parameters within network nodes 401a, 401b, ..., 401f may enable the network nodes to handle the data according to the specified quality of service.

In various embodiments of the invention, the network nodes 401a, 401b, ..., 401f may comprise a heterogeneous mix of network devices. For example, a network may be undergoing a phased upgrade where at an instant in time, a portion of network devices are upgraded or new and a portion of legacy devices have not yet been upgraded. In this regard, the upgraded network devices may be operable to detect data markings or tags and operate according to information provided by the markings and/or tags while the legacy network devices are not operable to utilize the marking and/or tag information. The markings and or tags may be inserted into packets in such a way that operation of the legacy network devices is not disrupted by the inserted information.

In an exemplary embodiment of the invention, devices within the network 400, for example, network devices at the edge of a bounded network such as the network node 401f, may be operable to insert markings and/or tags within a packet. This might occur, for example, when an endpoint device does not have marking capability or for example, when a service provider is operable to marks packets.

Figure 5:
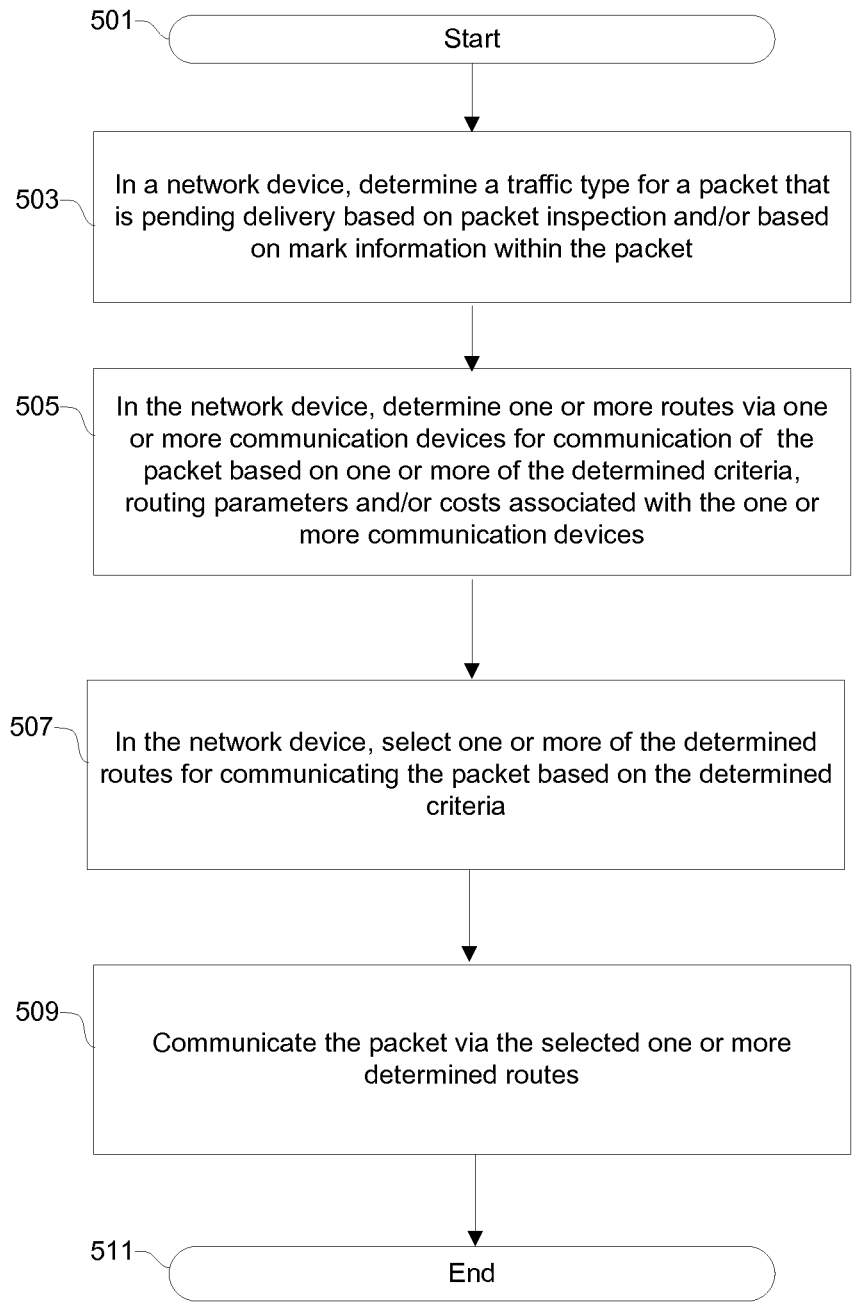
FIG. 5 is a flow chart illustrating exemplary steps for routing data based on one or more of routing parameters, costs associated with a device and/or data marking and/or tag information, in accordance with an embodiment of the invention.

FIG. 5 is a flow chart illustrating exemplary steps for routing data based on one or more of routing parameters, costs associated with a device and/or data marking and/or tag information, in accordance with an embodiment of the invention. Step 501, is a start step. In step 503, based on a mark within a packet that may be pending delivery, determine a traffic type for the packet. For example, for the packet 300 that may be communicated from the device 201a, determine a traffic type based on the mark 312 information within the packet 300. In step 505, one or more routes may be determined for communication of the packet 300 via one or more communication devices based on one or more of the determined criteria, routing parameters and/or costs associated with the one or more communication devices. In step 507, one or more of the determined routes for communicating the packet 300 may be selected based on the determined criteria. In step 509, the packet 300 may be communicated via the selected one or more determined routes, for example, to the communication device 201b. Step 511, is the end of exemplary steps.

In an embodiment of the invention, one or more processors and/or circuits in one or more of a plurality communication devices, for example, 201a and/or 201b, and/or 401a, 401b, . . . , 401g, may determine one or more routes over which packets, for example, the packet 300, may be communicated. The packets may be communicated between a first communication device, for example 201a of the plurality of communication devices and a second communication device, for example, 201b of the plurality of communication devices. Furthermore, the packets may be communicated based on one or more of corresponding marks and/or tags, for example, the mark and/or tag 312 within the packets, routing parameters and/or costs that may be associated with utilizing the determined routes. At least one determined route may be selected for communicating the packets between the first communication device and the second communication device and the packets may be communicated via the at least one selected route. The parameters may comprise information for one or more of service class capabilities, real time compression capabilities, packet preemption capabilities, quality measurement capabilities, tier bypass capabilities and power usage, for example. The one or more costs may comprise information for one or more of capacity, efficiency and/or performance of one or more of power usage, bandwidth, memory and processing, for example. Moreover, the one or more corresponding marks and/or tags may comprise information for one or more of user device capabilities, service class, quality measurements, latency requirements and power usage requirements, for example. The corresponding marks and/or tags, for example, the tag 312, may be inserted within the packets, for example, the packet 300, by one or more of an endpoint device, for example the endpoint device 405a, a software application and/or a service provider.

One or more routes, for example, the route 411 over which the packets may be communicated may be determined and/or selected based on one or more of shortest path bridging and audio video bridging. Additionally, one or more routes, for example the route 411, over which the packets may be communicated may be selected based on the one or more corresponding marks and/or tags within the packets, the routing parameters and/or the costs. The routing parameters and/or the costs may be received and/or discovered from the plurality of communication devices, for example, the communication devices 201b. The packets, for example, the packet 300 and/or the corresponding marks and/or tags, for example, the mark and/or tag 312, may be parsed and/or inspected. One or more costs may be based on one or more of the routing parameters. In this manner, routing of packet data via one or more network nodes may be based on marks and/or tags within the data, routing parameters and/or costs associated with the one or more network nodes.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for dynamic routing and/or switching in a network.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   at a network node of a communication network, receiving over a network a packet from a first endpoint device to be communicated to a second endpoint device;
   parsing the packet to identify a type field and mark information inserted in the packet by the first endpoint device, the mark information defining a traffic type of content of the packet, the mark information being independent of and additional to any addressing or protocol-identifying information otherwise contained in the packet;
   determining from the type field that a protocol being transported by the packet utilizes the mark information;
   if the packet utilizes the mark information, determining, from the mark information, criteria for routing the packet from the network node;
   using the criteria for routing the packet, selecting a route over which the packet may be communicated from the network node; and communicating the packet from the network node via the selected route.

2. The method of claim 1 further comprising:
storing at the network node routing parameters for packets communicated at the network node, including the packet; and
retrieving the stored routing parameters for the packet using the mark information inserted in the packet.

3. The method of claim 1 wherein parsing the packet comprises:
identifying an Ethertype field in the packet;
identifying a payload field in the packet;
determining from the Ethertype field that a protocol being transported by the packet utilizes the mark information; and
parsing the payload field to identify a subtype mark which includes the traffic type of the content of the packet.

4. The method of claim 1 wherein parsing the packet comprises:
identifying an Ethertype field in the packet;
identifying a payload field in the packet;
determining from the Ethertype field a protocol being transported by the packet
determining from the protocol that the mark information is utilized by the protocol;
identifying an internet protocol (IP) header in the packet; and
parsing the IP header to identify a mark which defines the traffic type of the content of the packet.

5. The method of claim 1, further comprising:
determining, from the mark information, communication protocol criteria for the packet;
using the communication protocol criteria, identifying a latency condition for the packet from routing parameters storing at the network node for packets communicated at the network node; and
processing the packet according to the identified latency condition.

6. The method of claim 5 wherein processing the packet according to the identified latency condition comprises:
using the identified latency condition to select a route over which the packet may be communicated from the network node having a latency conforming to the identified latency condition.

7. The method of claim 5 wherein determining communication protocol criteria comprises determining that the packet comprises multi-party interactive Internet gaming data requiring a relatively very low latency condition.

8. The method of claim 1 wherein determining, from the mark information, criteria for routing the packet from the network node comprises determining routing parameters and costs associated with possible routes for routing the packet from the network node from among stored routing parameters and stored costs stored in memory at the network node.

9. The method of claim 8 further comprising:
receiving at the network node information defining routing parameters and costs and capabilities for the first endpoint device and the second endpoint device; and
storing the received information in the memory at the network node.

10. The method of claim 8 further comprising:
receiving at the network node information defining routing parameters and costs and capabilities for other network nodes in data communication with the network node and one of the first endpoint device and the second endpoint device;

storing the received information for other network nodes in the memory at the network node; and
using the criteria for routing the packet from the mark information and the stored information for other network nodes to select the route over which the packet may be communicated from the network node.

11. A network node comprising:
a memory configured to store data defining routing parameters for packets communicated from the network node to other destinations in a network including the network node, the data received from other network devices in the network;
a circuit configured to receive over the network a packet from a network source to be communicated to a network destination;
a circuit configured to parse the packet to identify in the packet mark information inserted in the packet by a first endpoint device, the mark information being independent of and additional to any addressing or protocol-identifying information otherwise contained in the packet;
a circuit configured to determine, using the mark information, routing criteria for the packet;
a circuit configured to select from the memory, using the determined routing criteria, routing parameters for the packet;
a control plane configured to select a packet route through the network for the packet using the selected routing parameters for the packet; and
routing circuitry responsive to the control plane to route the received packet to a proper egress link from the network to the selected packet route.

12. The network node of claim 11 further comprising:
a circuit configured to parse the packet to identify a protocol type of the packet;
a circuit configured to determine from the protocol type that a protocol being transported by the packet utilizes the mark information;
a mark identifying circuit configured to parse a predetermined field of the packet to identify a mark which identifies the traffic type of the content of the packet;
the circuit configured to determine the routing criteria for the packet being configured to respond to the identified traffic type to determine the routing criteria.

13. The network node of claim 12 wherein the mark identifying circuit is configured to parse a payload of the packet to identify the mark.

14. The network node of claim 12 wherein the mark identifying circuit is configured to parse an internet protocol (IP) header of the packet to identify the mark.

15. The network node of claim 11 wherein the memory is further configured to store data defining device capabilities and routing costs for packets communicated from the network and wherein the network node further comprises a circuit configured to consider tradeoffs between routing parameters, device capabilities and routing costs for routing the packet and for use by the control plane to select the packet route.

16. The network node of claim 15 wherein the circuit configured to consider tradeoffs operates in response to a type of data of the packet, a class of service being provided by the packet, a type of service being provided by the packet or an expressed preference.

17. A method comprising:
at an endpoint device of a communication network, formatting a packet with a source address, a destination address, and a payload;

formatting the packet with a mark, the mark being independent of other content of the packet, the mark defining routing criteria for the packet for routing the packet by network nodes of the communication network, the mark for use by the network nodes for decoding the routing criteria by retrieving routing information for the packet from storage at the network nodes using information in the mark; and communicating the packet to a first network node for routing to a network destination defined by the destination address.

18. The method of claim 17 wherein formatting the packet with a mark comprises:

formatting the mark with data defining routing parameters for network nodes of the communication network; and inserting the formatted mark at an appropriate location in the packet.

19. The method of claim 18 wherein inserting the formatted mark at an appropriate location in the packet comprises inserting the formatted mark in the payload of the packet.

20. The method of claim 18 wherein inserting the formatted mark at an appropriate location in the packet comprises inserting the formatted mark in the packet in such a way that communication of the packet including the formatted mark through legacy devices of the communication network does not disrupt operation of the legacy devices.

* * * * *